(12) United States Patent
Sharma

(10) Patent No.: US 11,824,856 B1
(45) Date of Patent: Nov. 21, 2023

(54) CHAINING OF AUTHORIZATIONS

(71) Applicant: Amazon Technologies, Inc., Seattle, WA (US)

(72) Inventor: Anurag Sharma, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 237 days.

(21) Appl. No.: 16/926,108

(22) Filed: Jul. 10, 2020

(51) Int. Cl.
*H04L 29/06* (2006.01)
*H04L 9/40* (2022.01)
*H04L 9/32* (2006.01)

(52) U.S. Cl.
CPC ........ *H04L 63/0884* (2013.01); *H04L 9/3265* (2013.01); *H04L 63/0823* (2013.01)

(58) Field of Classification Search
CPC H04L 63/0884; H04L 63/0823; H04L 9/3265
See application file for complete search history.

(56) References Cited

U.S. PATENT DOCUMENTS

| | | | | |
|---|---|---|---|---|
| 11,240,025 | B2* | 2/2022 | Wentz | G06F 21/64 |
| 11,334,882 | B1* | 5/2022 | Jameson | H04L 9/3231 |
| 11,638,147 | B2* | 4/2023 | Irvin | H04L 67/131 |
| | | | | 726/4 |
| 2007/0038765 | A1* | 2/2007 | Dunn | G06F 21/6218 |
| | | | | 709/229 |
| 2012/0227097 | A1* | 9/2012 | Nakhjiri | G06F 21/42 |
| | | | | 726/7 |
| 2013/0036455 | A1* | 2/2013 | Bodi | H04L 63/0807 |
| | | | | 726/4 |
| 2013/0086645 | A1* | 4/2013 | Srinivasan | H04L 9/3234 |
| | | | | 726/4 |
| 2015/0089571 | A1* | 3/2015 | Srinivasan | H04W 12/06 |
| | | | | 726/1 |
| 2015/0089617 | A1* | 3/2015 | Sondhi | H04L 63/08 |
| | | | | 726/8 |
| 2016/0352723 | A1* | 12/2016 | Li | H04L 63/083 |
| 2017/0302655 | A1* | 10/2017 | Sondhi | H04L 63/10 |
| 2019/0294817 | A1* | 9/2019 | Hennebert | H04L 9/0861 |
| 2020/0007530 | A1* | 1/2020 | Mohamad Abdul | |
| | | | | H04W 12/084 |
| 2020/0358755 | A1* | 11/2020 | Abdul | H04W 12/084 |

(Continued)

OTHER PUBLICATIONS

Haridimos Kondylakis et al., Flexible Access to Patient Data through e-Consent, Dec. 2015, ACM, pp. 263-266. (Year: 2015).*

(Continued)

*Primary Examiner* — Luu T Pham
*Assistant Examiner* — Fahimeh Mohammadi
(74) *Attorney, Agent, or Firm* — Thomas | Horstemeyer, LLP

(57) ABSTRACT

Disclosed are various embodiments for chaining of authorizations in an authorization framework. In one embodiment, a service receives an authorization request for access by a relying party service operated by a first entity to obtain information associated with a user account. The service determines that the authorization request requires a consent of a second entity. The service then obtains a first authorization token representing the consent of the second entity. The service generates a second authorization token based at least in part on the first authorization token. The service sends the second authorization token to the relying party service.

20 Claims, 10 Drawing Sheets

(56) References Cited

U.S. PATENT DOCUMENTS

2020/0382510 A1* 12/2020 Dunjic ................. G06F 21/645

OTHER PUBLICATIONS

Eve Maler, Extending the Power of Consent with User-Managed Access, Jul. 20, 2015, IEEE, pp. 175-179. (Year: 2015).*
Cigdem Sengul, Privacy, Consent and Authorization in IoT, Apr. 17, 2017, IEEE, pp. 319-321. (Year: 2017).*
Nitin Naik et al., Securing Digital Identities in the Cloud by Selecting an Apposite Federated Identity Management from SAML, OAuth and OpenID Connect, Jun. 26, 2017, IEEE, pp. 1-12. (Year: 2017).*
U.S. Patent Application entitled "Person-Based Authorization for Shared Account Systems" assigned U.S. Appl. No. 16/918,764, filed Jul. 1, 2020.

* cited by examiner

CHAINING OF AUTHORIZATIONS

BACKGROUND

Typical authentication and authorization frameworks may include three parties: a customer, a relying party, and an identity provider. The customer can share the customer's information or a certain permission with the relying party via the identity provider. For example, once the identity provider authenticates the customer, the identity provider may issue a token that allows the relying party to confirm the customer's identity with the identity provider or obtain data from the identity provider that the customer has consented to share with the relying party.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
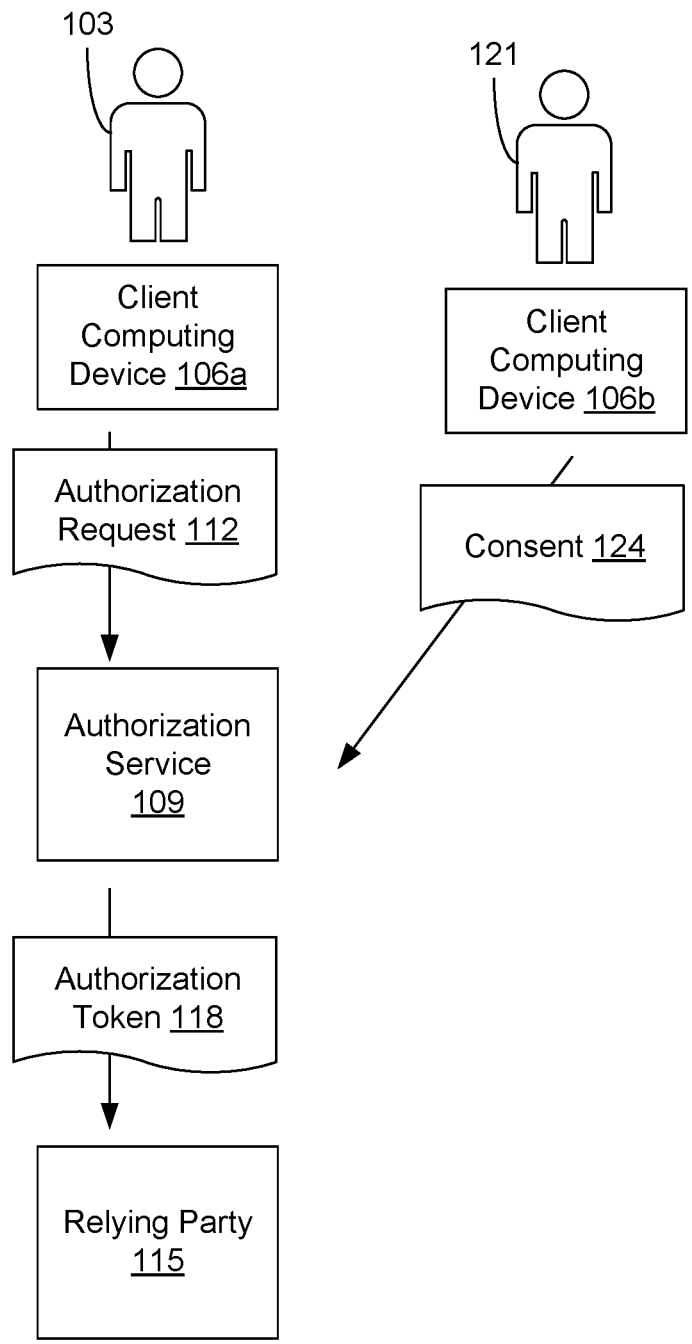
FIGS. 1A-1C are drawings of example scenarios involving chaining of authorizations according to various embodiments of the present disclosure.

The present disclosure relates to chaining of authorizations from multiple parties in an authorization framework. Authorization frameworks, such as OAuth, have been designed to model consent among three parties: a customer, an identity provider, and a relying party. However, in many examples, these parties may be more complex than just a single person or entity, and existing authentication frameworks are not able to support such scenarios.

In some examples, the customer can be a group of people. In one example, a child may want to play a game, but the game is requesting the child's personal information. In such a case, the child's parent must consent on the child's behalf. In another example, a customer may appoint another customer as a delegate to consent on the customer's behalf. In yet another example, the customer may be a company with multiple employees, and one or more of the employees may be appointed to consent on behalf of the company. In another case, the company may appoint a contractor that is its own company to consent on its behalf, and the contractor may have one or more employees that are delegated to consent on behalf of the company.

In some examples, the relying party may include multiple people or entities. In one example, the relying party is a company that builds applications for others that require certain customer permissions to operate, such as access to a camera video stream. In another example, the relying party may be a company that hires another company for managing their systems, and that other company may request customer information on behalf of the first company. In each of these cases, the chain of command may extend even further than two individuals, if the second person appoints another entity to consent on the second person's behalf. These scenarios are difficult to represent in a framework such as OAuth that is based on three entities. The simplification also can cause a loss of information about delegation and modeling of permissions among other sub-entities.

Various embodiments of the present disclosure introduce approaches for chaining of authorizations in an authorization framework to handle scenarios that are more complex than typical three-party authorization. Each of the subsystems can themselves be modeled as an individual transaction in the authorization framework, and arbitrarily complex transactions can be constructed by chaining these sub-transactions. The plurality of consents may be managed by separate authorization services that can work together with one another.

As one skilled in the art will appreciate in light of this disclosure, certain embodiments may be capable of achieving certain advantages, including some or all of the following: (1) improving the privacy and security of computer systems by allowing for arbitrarily complex hierarchies of permissions in authorization frameworks; (2) improving the functionality and security of computer systems and networks by automatically handling situations where a user at an entity who previously provided a required consent leaves that entity; (3) enhancing computer authentication and authorization protocols by augmenting authorization tokens to support arbitrarily nested information of sub-transactions; (4) reducing computer resource consumption (e.g., in terms of processor time, memory consumption, and bandwidth usage) associated with users obtaining required consents from one or more other users outside of the authorization framework; (5) implementing parental controls or authorization delegation natively within an authorization framework, thereby improving consistency and interoperability among potentially multiple applications using the same authorization framework; and so forth.

Referring now to FIG. 1A, shown is an example scenario 100 involving chaining of authorizations. In the scenario 100, a user 103 at a client computing device 106a, which has been authenticated for access to a user account by an authorization service 109, initiates an authorization request 112 to access one or more resources or perform one or more operations associated with a relying party 115. Typically, the authorization service 109 would verify that the user 103 or associated account has permission to access the resources or perform the operations, and then upon completing the verification, issue an authorization token 118 for use by the relying party 115 to confirm that the user 103 or account has permission.

In this case, however, the authorization service 109 determines that one or more other users must consent to the authorization request 112. Thus, the user 121 at the client computing device 106b may be notified to provide the consent 124, which may also be in the form of an authorization token 118 and may be provided by the same authorization service 109 or a different authorization service 109. Upon receiving the consent 124, the authorization service 109 generates the authorization token 118 to be provided to the relying party 115. The authorization token 118 may include an indication of the consent 124 so that the relying party 115 can confirm that all appropriate consents 124 have been provided.

Figure 1B:
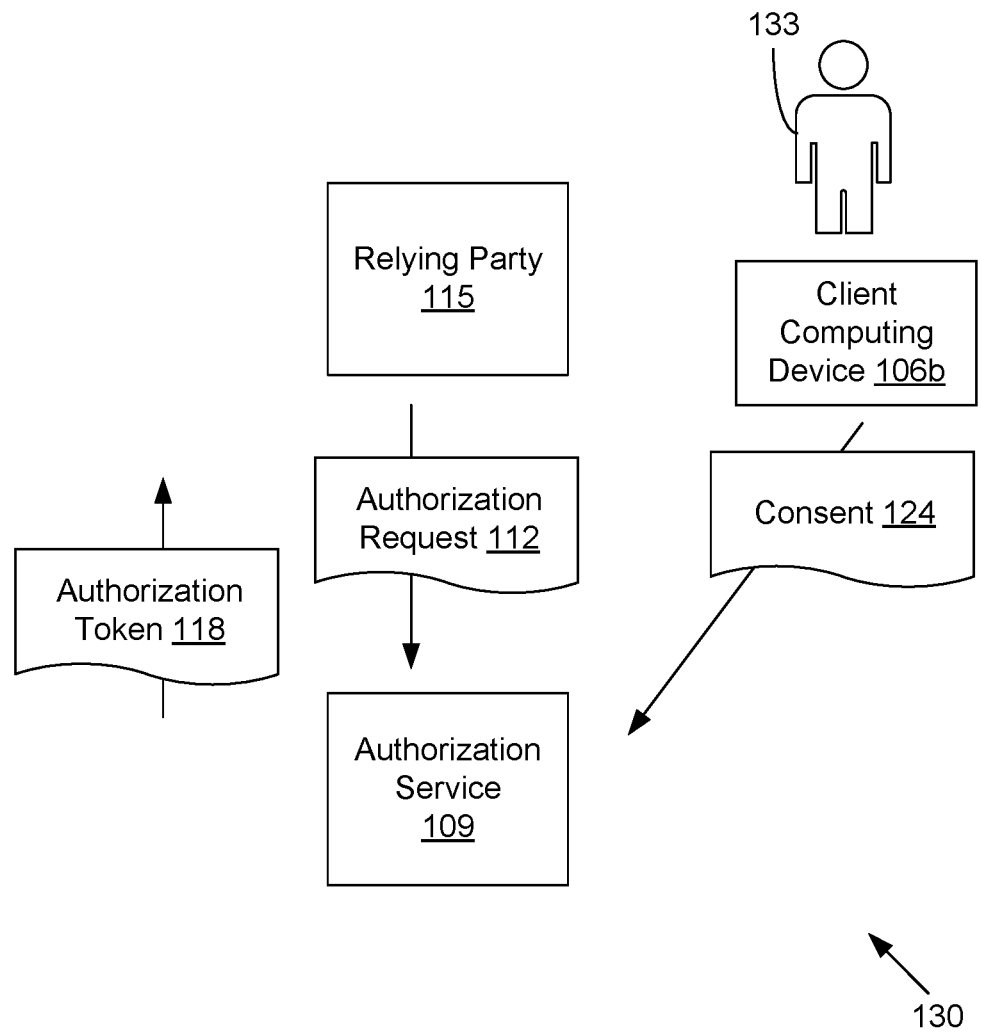

Turning to FIG. 1B, shown is another example scenario 130 involving chaining of authorizations. In this scenario 130, the relying party 115 sends an authorization request 112 to the authorization service 109. For example, the relying party 115 may request to access information associated with the user 103 (FIG. 1A) or the associated account.

In order for the authorization request 112 to be approved, in this example, another party, such as the user 133, is requested to give consent 124 by the authorization service 109. For example, the relying party 115 may be operated on behalf of another entity, and an agent of the other entity may be required to provide the consent 124. Once the consent 124 is received from the user 133 via the client computing device 106b, the authorization service 109 generates the authorization token 118, which is then returned to the relying party 115 in order to obtain the information associated with the user 103.

Figure 1C:
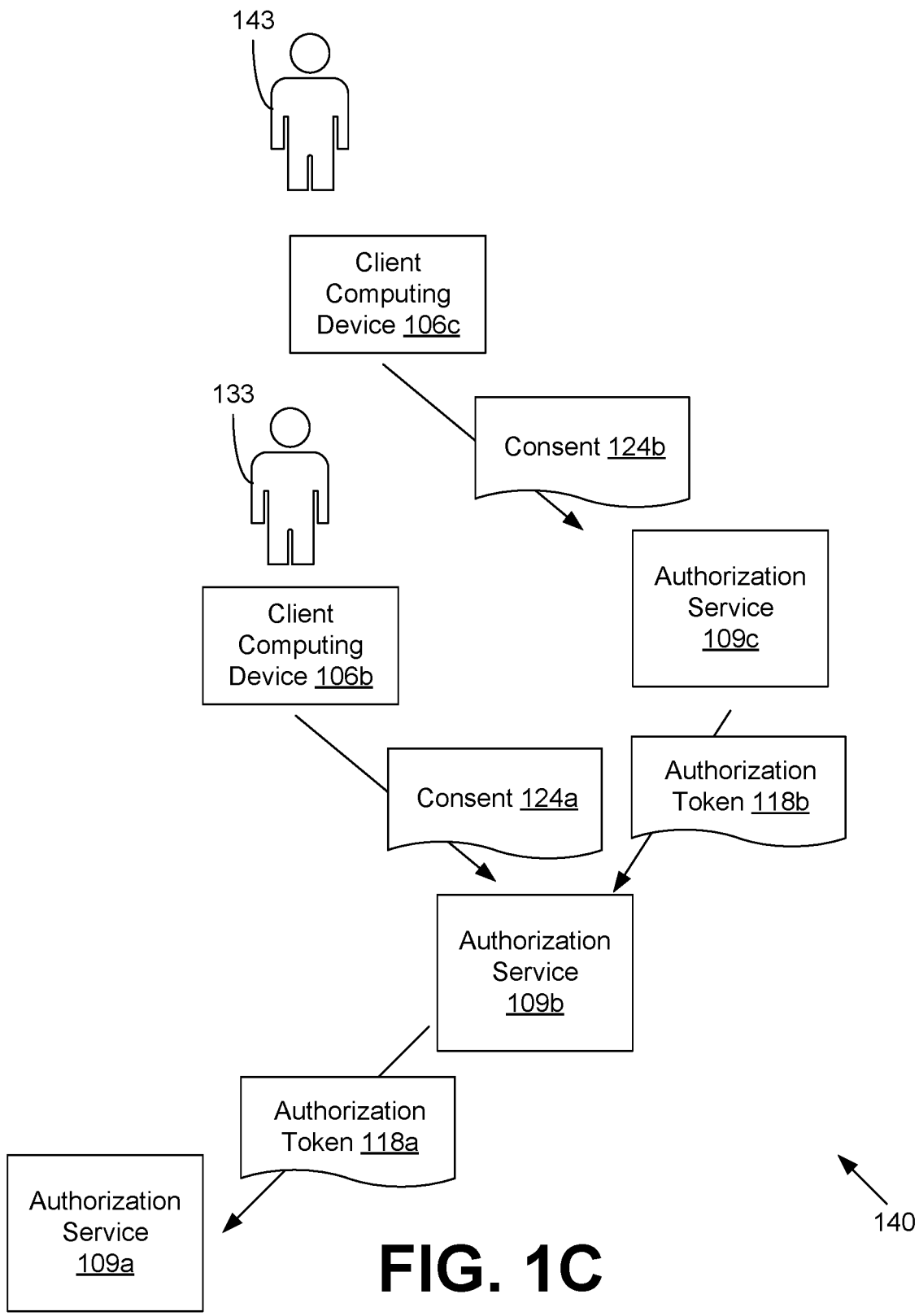

Moving on to FIG. 1C, shown is an example scenario 140 involving nested consents managed by a plurality of authorization services 109a, 109b, and 109c. In the scenario 140, the authorization depends on consent 124a of the user 133, as in FIG. 1B. The user 133 provides the consent 124a to the authorization service 109b, which in turn provides to the authorization service 109a an authorization token 118a representing the consent 124a in a form verifiable by the authorization service 109b. However, the authorization service 109b may also determine that consent 124b from another user 143 is necessary.

Accordingly, the user 143 may provide the consent 124b to another authorization service 109c, which then sends the authorization token 118b to the authorization service 109b. The authorization service 109b may then generate the authorization token 118a depending on both the consent 124a and the authorization token 118b, which in turn depends on the consent 124b. In the following discussion, a general description of the system and its components is provided, followed by a discussion of the operation of the same.

Figure 2:
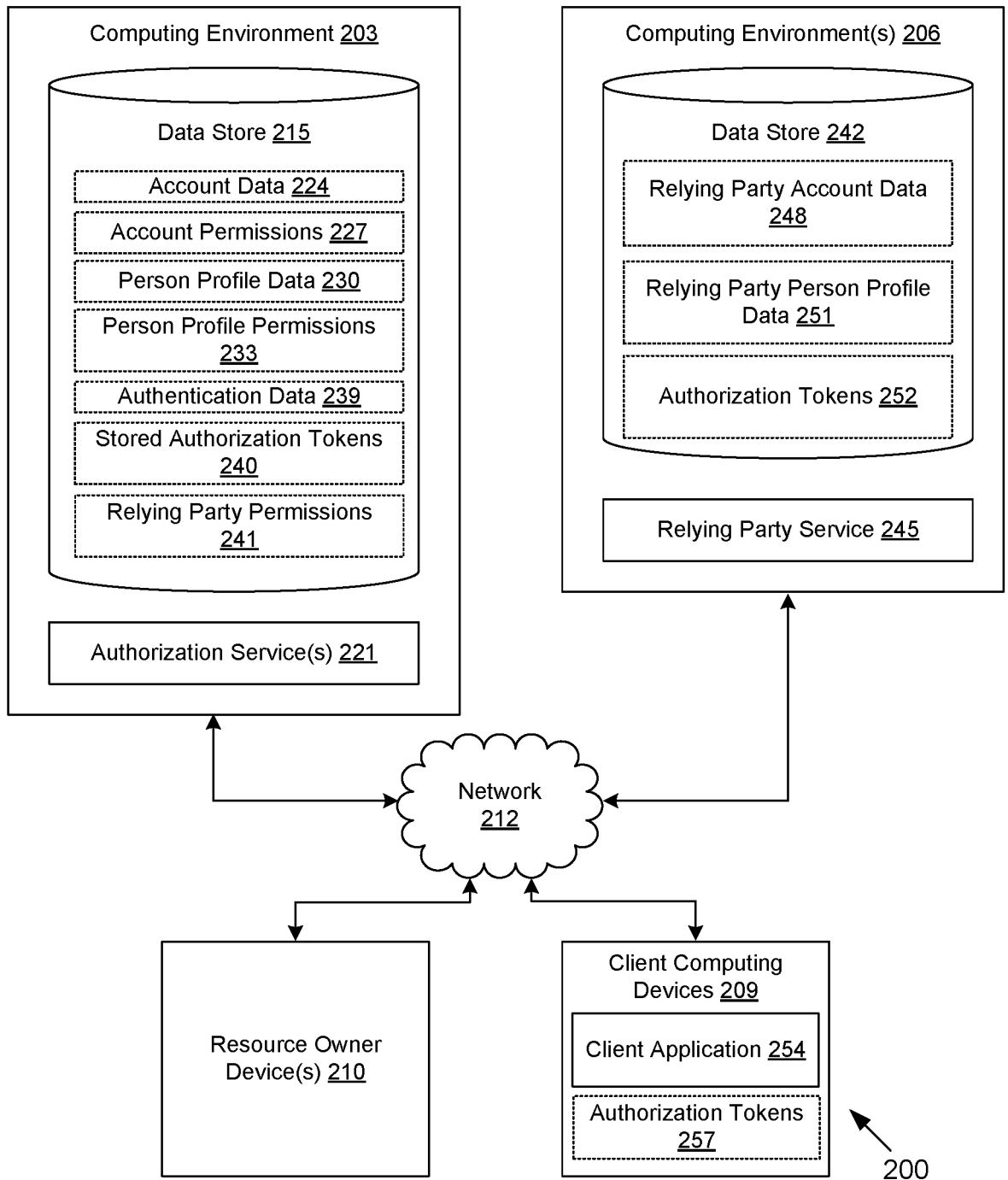
FIG. 2 is a schematic block diagram of a networked environment according to various embodiments of the present disclosure.

With reference to FIG. 2, shown is a networked environment 200 according to various embodiments. The networked environment 200 includes a computing environment 203, one or more computing environments 206, one or more client computing devices 209, and one or more resource owner devices 210, which are in data communication with each other via a network 212. The network 212 includes, for example, the Internet, intranets, extranets, wide area networks (WANs), local area networks (LANs), wired networks, wireless networks, cable networks, satellite networks, or other suitable networks, etc., or any combination of two or more such networks. The computing environment 203, the computing environments 206, and the client computing devices 209 may be separate entities, or independent and distinct computing systems that are physically and/or logically isolated. Further, the computing environment 203, the computing environments 206, and the client computing devices 209 may be operated and/or managed by different entities.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of a plurality of data stores 215 as can be appreciated. The data stored in the data store 215, for example, is associated with the operation of the various applications and/or functional entities described below.

The components executed on the computing environment 203, for example, include an authorization service 221 and other applications, services, processes, systems, engines, or functionality not discussed in detail herein. The authorization service 221 is generated to authorize client computing devices 209 to access resources and/or perform operations and/or to authorize relying parties to obtain information associated with a user or user account. The authorization service 221 may use an authorization framework such as OAuth, OpenID Connect, Security Assertion Markup Language (SAML), or other frameworks. In some embodiments, the authorization service 221 acts as a federated identity provider on behalf of one or more relying parties, so that a single log-in with the authorization service 221 by the client computing device 209 will authenticate the client computing device 209 on behalf of one or more relying parties in the computing environments 206. In various embodiments, the authorization service 221 may represent a plurality of services including an identity provider service, a voice interaction service, a profile data management service, an authentication service, a permissions service, and other services. It is understood that there may be multiple authorization services 221 in potentially multiple computing environments 203 that may be under the control of different entities.

The data stored in the data store 215 includes, for example, account data 224, account permissions 227, person profile data 230, person profile permissions 233, authentication data 239, stored authorization tokens 240, relying party permissions 241, and potentially other data. The account data 224 corresponds to the accounts through which client computing devices 209 access the authorization service 221. The account data 224 may include profile information, such as name and contact information for the account owner, interaction history, purchased items, and other information. The account data 224 may associate each account with a unique account identifier.

The account permissions 227 may control what types of actions may be performed via a given account. Such actions may include purchasing items, performing certain types of commands, adding users, adding first-party or third-party applications, and so on. The account permissions 227 may also define what portions of the account data 224 may be shared with third parties, which could include all third parties or specifically enumerated third parties. The account permissions 227 may also require that consent be obtained from one or more other users in order for access to a resource or to perform an operation to be granted. The account permissions 227 may identify a specific account, user, or user role within a hierarchy of an entity for the user(s) who are to provide consent.

The person profile data 230 corresponds to profile data individually associated with a person. To this end, the person profile data 230 may include information such as name, email address, purchase history, birthdate, mailing address, and/or other personally identifying information. The person profile data 230 may include information that is similar to that of the account data 224 except that the account data 224 is associated with either the account owner or multiple users of the account, while the person profile data 230 is associated with a single person. The person profile data 230 may associate each person with a unique person identifier. Various approaches to using person identifiers for shared accounts are described in U.S. patent application Ser. No. 16/918,764, entitled "PERSON-BASED AUTHORIZATION FOR SHARED ACCOUNT SYSTEMS," and filed on Jul. 1, 2020, which is incorporated herein by reference in its entirety.

The person profile permissions 233 may control what types of actions may be performed for or by a person. Such actions may include purchasing items, performing certain types of commands, adding first-party or third-party applications, and so on. The person profile permissions 233 may also define what portions of the person profile data 230 may be shared with third parties, the person profile permissions 233 may also require that consent be obtained from one or more other users in order for access to a resource or to perform an operation to be granted. The person profile permissions 233 may identify a specific account, user, or user role within a hierarchy of an entity for the user(s) who are to provide consent.

The authentication data 239 includes data used to authenticate individuals or accounts. This data may include usernames, passwords, public or private keys, symmetric keys, registration credentials, voice recognition profiles, face recognition profiles, fingerprint profiles, and so on.

The stored authorization tokens 240 may include previously received or generated authorization tokens, or portions of data from those tokens, that represent consent previously provided by users or entities, where the consent may persist for a period of time or indefinitely until revoked. For example, a first user may provide consent for a second user to perform an action or access a resource, and specify that the consent is to be valid for the next 30 days. A corresponding representation of the consent, such as an authentication token, may be stored in the data store 215 such that the first user does not need to provide consent responsive to subsequent requests within the 30-day time window for validity. In some cases, if the first user's authority to consent is revoked before the consent expires (e.g., by the first user leaving the entity or taking another role in the hierarchy of the entity), the stored authentication token 240 may also be revoked prematurely.

The relying party permissions 241 may give relying parties permission to access resources or perform operations subject to consent by other users or entities. For example, a relying party may be a hosting provider or developer who has created an application on behalf of another entity, and that other entity may be required to consent to the relying party accessing data of users or other protected resources, or performing operations.

The computing environment(s) 206 may be operated by a third party to provide applications to the client computing device 209 by way of the authorization service 221. The computing environment 206 may comprise, for example, a server computer or any other system providing computing capability. Alternatively, the computing environment 206 may employ a plurality of computing devices that may be arranged, for example, in one or more server banks or computer banks or other arrangements. Such computing devices may be located in a single installation or may be distributed among many different geographical locations. For example, the computing environment 206 may include a plurality of computing devices that together may comprise a hosted computing resource, a grid computing resource, and/or any other distributed computing arrangement. In some cases, the computing environment 206 may correspond to an elastic computing resource where the allotted capacity of processing, network, storage, or other computing-related resources may vary over time.

Various applications and/or other functionality may be executed in the computing environment 206 according to various embodiments. Also, various data is stored in a data store 242 that is accessible to the computing environment 206. The data store 242 may be representative of a plurality of data stores 242 as can be appreciated. The data stored in the data store 242, for example, is associated with the operation of the various applications and/or functional entities described below.

The components executed on the computing environment 206, for example, include a relying party service 245 and other applications, services, processes, systems, engines, or functionality not discussed in detail herein. The relying party service 245 is executed to provide resources or perform operations. For example, the relying party service 245 may provide functionality for an application to the client computing device 209 via the authorization service 221. Various applications may enable online shopping, banking activities, gaming, management of IoT devices, podcasts, music playing, task list management, and other activities. In some embodiments, the applications provided by the relying party service 245 may be referred to as "skills" provided through the authorization service 221. In various scenarios, the relying party service 245 and the authorization service 221 may be operated by the same entity or by different entities. That is to say, the relying party service 245 may be considered a third party relative to the authorization service 221.

The data stored in the data store 242 includes relying party account data 248, relying party person profile data 251, authorization tokens 252, and/or other data. The relying party account data 248 corresponds to data maintained by the relying party service 245 in association with accounts. For example, the relying party account data 248 may contain state, history, or customizations for the application based at least in part by usage under a particular account. The relying party person profile data 251 corresponds to data maintained by the relying party service 245 in association with individual persons. For example, the relying party person profile data 251 may contain state, history, or customizations for the application based at least in part by usage by an individual person.

The authorization tokens 252 may include previously received or generated authorization tokens, or portions of data from those tokens, that represent consent previously provided by users or entities, where the consent may persist for a period of time or indefinitely until revoked. For example, a first user may provide consent for a second user to perform an action or access a resource, and specify that the consent is to be valid for the next 30 days. A corresponding representation of the consent, such as an authorization token 252, may be stored in the data store 242 such that the first user does not need to provide consent responsive to subsequent requests within the 30-day time window for validity. In some cases, if the first user's authority to consent is revoked before the consent expires (e.g., by the first user leaving the entity or taking another role in the hierarchy of the entity), the authorization token 252 may also be revoked prematurely.

The client computing device 209 and the resource owner device 210 are representative of a plurality of client devices that may be coupled to the network 212. The client computing device 209 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. In particular, the client computing device 209 may function as a shared account device such that it is available to be used by multiple users having physical access to it, while the client computing device 209 is logged in for accessing a single account. For example, the client computing device 209 may correspond to a living room device, a wall mounted device, an IoT device, and so forth.

The client computing device 209 may be configured to execute various applications such as a client application 254 and/or other applications. The client application 254 may be executed in a client computing device 209, for example, to access network content served up by the computing environment 203 and/or other servers. In various embodiments, the client application 254 is always logged in to the authorization service 221 via long-lived authorization tokens 257 that serve as registration credentials for a specific account.

In various embodiments, the client application 254 functions as a voice interface, whereby the client application 254 enters a listening mode in response to detecting a wake word or another environmental stimulus. The client application 254 may record voice commands and/or audio and transmit the commands and/or audio to the authorization service 221 via the network 212 for processing. In response, the client application 254 may receive data encoding synthesized speech from the authorization service 221 and then render the synthesized speech via a speaker. The client computing device 209 may be configured to execute applications beyond the client application 254 such as, for example, email applications, social networking applications, word processors, spreadsheets, and/or other applications.

In some embodiments, multiple client computing devices 209 may be used by the user. For example, one client computing device 209 may correspond to a voice interface device or an IoT device, while another client computing device 209 may correspond to a smartphone or tablet device executing a companion client application 254 to control the operation of the voice interface device or the IoT device. In one scenario, the companion client application 254 may be used to provide consent to share information with a relying party service 245.

The resource owner device 210 may correspond to an entity such as resource owner that has control over the permissions to access a resource or perform an operation via a relying party service 245. In particular, the entity may have ability to set permissions or to require consent from particular users or entities in order for a user at a client computing device 209 to have access.

Figure 3:
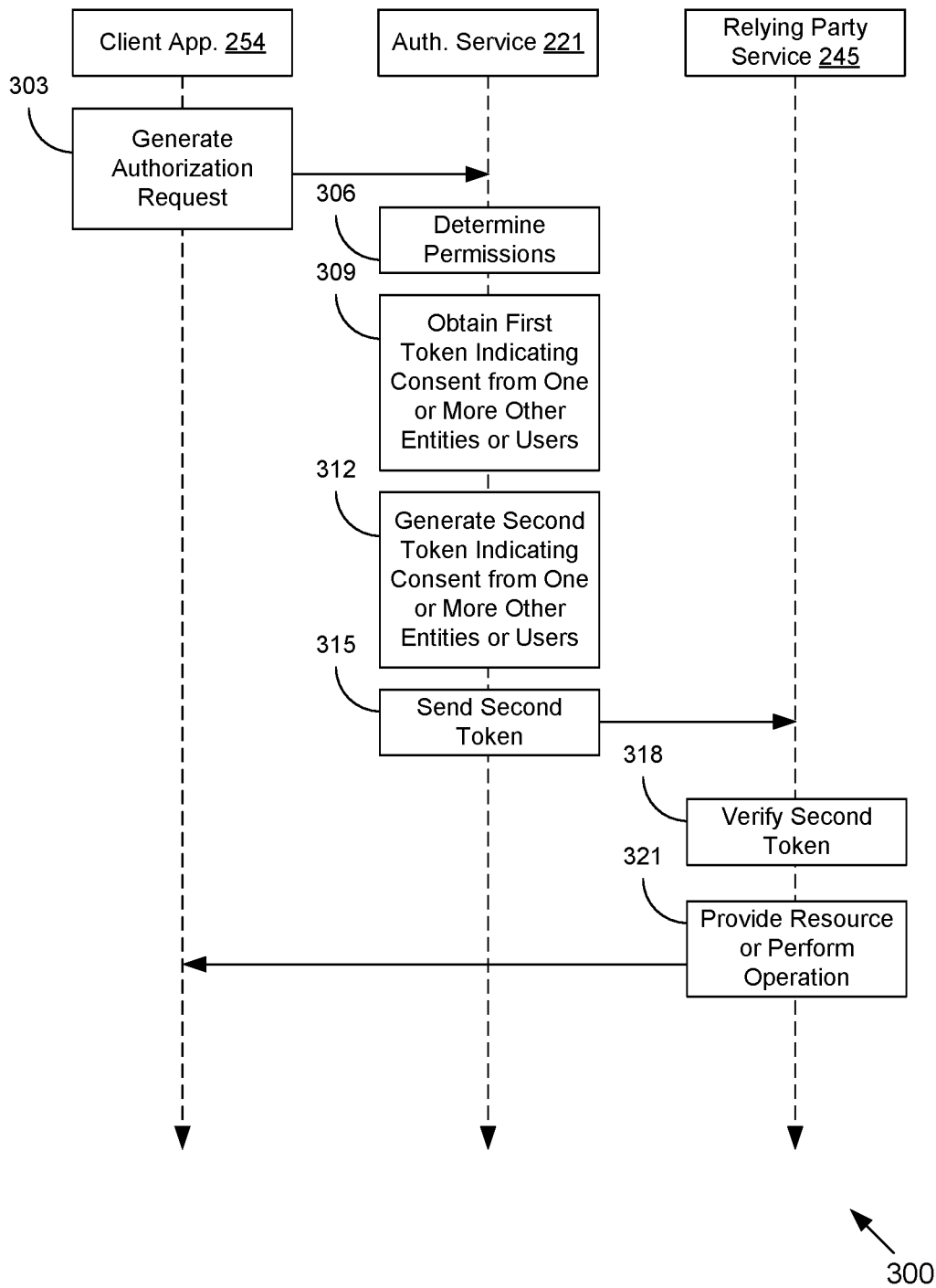
FIG. 3 is a sequence diagram that provides one example of the interaction among the client application, the authorization service, and the relying party service in the networked environment of FIG. 2 according to various embodiments of the present disclosure.

Moving on to FIG. 3, shown is a sequence diagram 300 that provides one example of the interaction among the client application 254, the authorization service 221, and the relying party service 245 according to various embodiments. It is understood that the sequence diagram 300 provides merely an example of the many different types of functional arrangements that may be employed to implement the operation of the client application 254, the authorization service 221, and the relying party service 245 as described herein. As an alternative, the sequence diagram 300 may be viewed as depicting an example of elements of a method implemented in the networked environment 200 (FIG. 2) according to one or more embodiments.

Beginning with box 303, the client application 254, which has already been authenticated by the authorization service 221, generates an authorization request. For example, a user may direct the client application 254 to access a resource or perform an operation using the relying party service 245, and the relying party service 245 relies upon the authorization service 221 to ensure that the client application 254 is authorized.

In generating the authorization request, the user may make a gesture, speak a voice command, tap a button, visit an application screen, access a web page, or perform another action that involves the relying party service 245. The authorization request may be sent directly from the client application 254 to the authorization service 221, or in other scenarios, may be sent from the relying party service 245 to the authorization service 221. The authorization request may include an authentication token to confirm that the client application 254 has already been authenticated by the authorization service 221.

In box 306, the authorization service 221 determines the permissions required to access the resource or perform the operation, and also whether the client application 254 has those permissions by virtue of being authenticated for access to a particular user account or person profile. The permissions may indicate that one or more other users and/or entities must give a consent in order for the client application 254 to be granted access. In some cases, this consent may depend on others giving consent to the individuals or entities that are specified to give consent. Thus, the consent may be nested. For example, for a first user to perform an operation, the permissions may request that a second user provide consent. However, another set of permissions, administered by the same or a different authorization service 221, may require that a third user provide consent for the second user to be able to provide consent for this situation.

In box 309, the authorization service 221 obtains a first authorization token 257 (FIG. 2) that indicates consent being provided by one or more other entities or users. In one scenario, the authorization service 221 may receive multiple authorization tokens 257 corresponding to consent provided by multiple parties. In another scenario, the authorization service 221 may receive an authorization token 257 representing a nested or chained consent, where one token is modified by another authorization service 221 to include a required consent, and this may continue in turn as many times as required.

In box 312, the authorization service 221 generates a second authorization token 257 that authorizes the client application 254 on the client computing device 209 (FIG. 2) to perform the operation or access the resource. The second authorization token 257 may include nested information from the first authorization token 257 that represents the required consents provided by one or more entities or users.

In box 315, the authorization service 221 sends the second authorization token 257 to the relying party service 245. Alternatively, the authorization service 221 may return the second authorization token 257 to the client application 254, which may then in turn supply the second authorization token 257 to the relying party service 245.

In box 318, the relying party service 245 verifies the second authorization token 257. For example, the relying party service 245 may verify a cryptographic signature of the second authorization token 257. In some embodiments, the verification process may include a nested process involving contacting multiple authorization services 221 in turn to verify sub-portions of the second authorization token 257. In box 321, the relying party service 245, having verified the second authorization token 257 and determining that the client application 254 has sufficient permissions and/or consent, provides the requested resource or performs the requested operation, and returns a result to the client application 254. Thereafter, the sequence diagram 300 ends.

Figure 4:
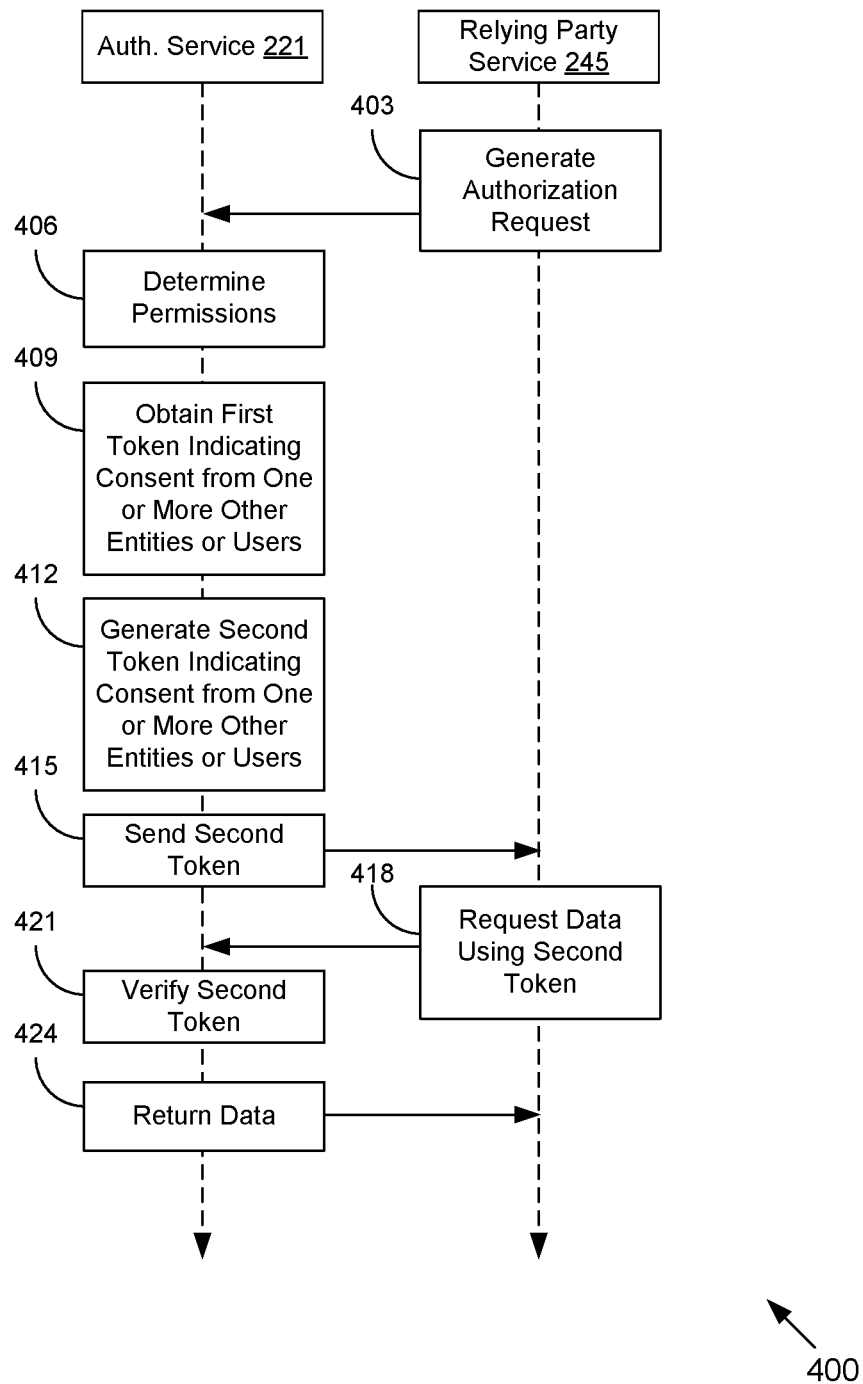
FIG. 4 is a sequence diagram that provides one example of the interaction among the authorization service and the relying party service in the networked environment of FIG. 2 according to various embodiments of the present disclosure.

Continuing to FIG. 4, shown is a sequence diagram 400 that provides one example of the interaction between the authorization service 221 and the relying party service 245 according to various embodiments. It is understood that the sequence diagram 400 provides merely an example of the many different types of functional arrangements that may be employed to implement the operation of the authorization service 221 and the relying party service 245 as described herein. As an alternative, the sequence diagram 400 may be viewed as depicting an example of elements of a method implemented in the networked environment 200 (FIG. 2) according to one or more embodiments.

Beginning with box 403, the relying party service 245 generates an authorization request. For example, a user at a client computing device 209 (FIG. 2) may request a resource or an operation to be performed by the relying party service 245. The relying party service 245 may need information about the user or the user's account in order to fulfill the request. Thus, the relying party service 245 may generate an authorization request to obtain the information from the account data 224 (FIG. 2) or the person profile data 230 (FIG. 2).

In box 406, the authorization service 221 determines the permissions required to access the requested information of the account data 224 and/or the person profile data 230 by the relying party service 245. The permissions may indicate that one or more other users and/or entities must give a consent in order for the relying party service 245 to be granted access. For example, the relying party service 245 may be operated on behalf of another entity, and the other entity may have to consent. In some cases, this consent may depend on others giving consent to the individuals or entities that are specified to give consent. Thus, the consent may be nested. For example, for a first user to perform an operation, the permissions may request that a second user provide consent. However, another set of permissions, administered by the same or a different authorization service 221, may require that a third user provide consent for the second user to be able to provide consent for this situation.

In box 409, the authorization service 221 obtains a first authorization token 257 (FIG. 2) that indicates consent being provided by one or more other users. In one scenario, the authorization service 221 may receive multiple authorization tokens 257 corresponding to consent provided by multiple parties. In another scenario, the authorization service 221 may receive an authorization token 257 representing a nested or chained consent, where one token is modified by another authorization service 221 to include a required consent, and this may continue in turn as many times as required.

In box 412, the authorization service 221 generates a second authorization token 257 that authorizes the client application 254 on the client computing device 209 to perform the operation or access the resource. The second authorization token 257 may include nested information from the first authorization token 257 that represents the required consents provided by one or more entities or users.

In box 415, the authorization service 221 sends the second authorization token 257 to the relying party service 245.

In box 418, the relying party service 245 requests the information from the authorization service 221 or another service of an identity provider using the second authentication token 257. The authorization service 221 verifies the second authentication token 257 in box 421. In some embodiments, the verification process may include a nested process involving contacting multiple authorization services 221 in turn to verify sub-portions of the second authorization token 257. Then, in box 424, upon verification, the authorization service 221 returns the requested data to the relying party service 245. Thereafter, the sequence diagram 400 ends.

Figure 5A:
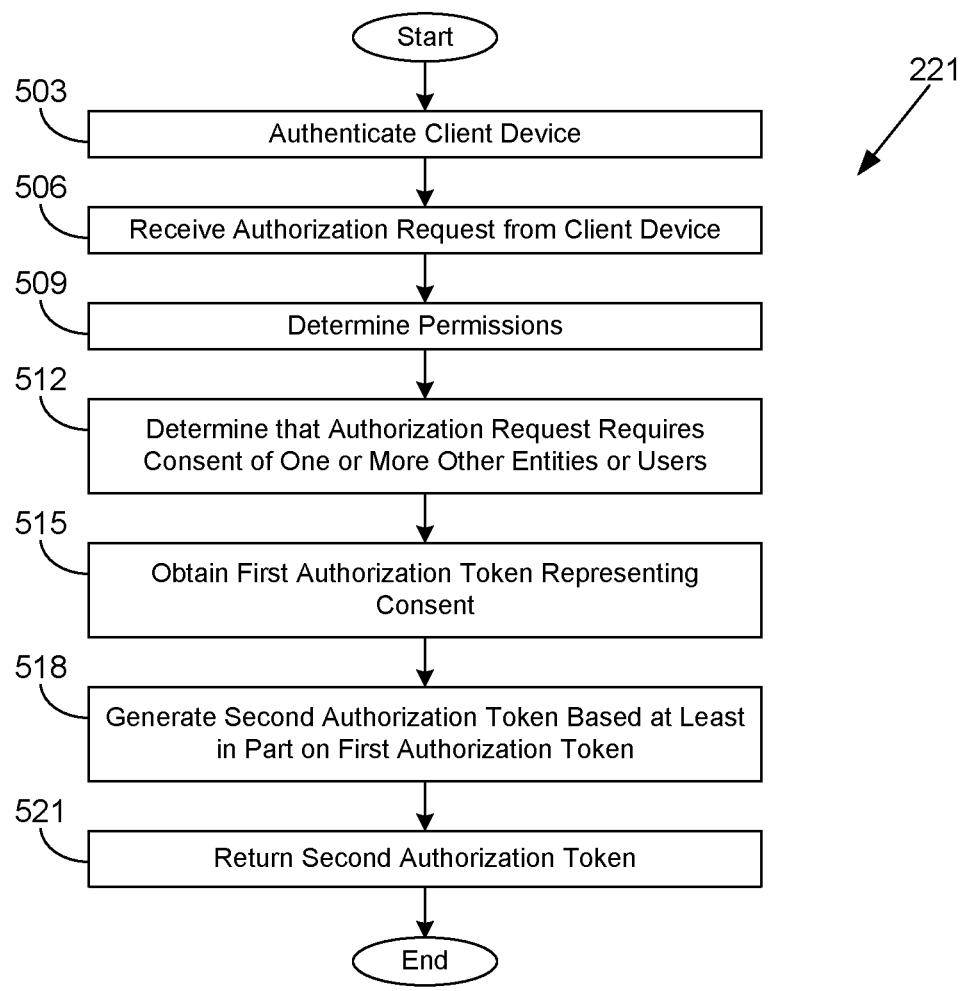
FIGS. 5A and 5B are flowcharts illustrating examples of functionality implemented as portions of an authorization service executed in a computing environment in the networked environment of FIG. 2 according to various embodiments of the present disclosure.

Referring next to FIG. 5A, shown is a flowchart that provides one example of the operation of a portion of the authorization service 221 according to various embodiments. It is understood that the flowchart of FIG. 5A provides merely an example of the many different types of functional arrangements that may be employed to implement the operation of the portion of the authorization service 221 as described herein. As an alternative, the flowchart of FIG. 5A may be viewed as depicting an example of elements of a method implemented in the computing environment 203 (FIG. 2) according to one or more embodiments.

Beginning with box 503, the authorization service 221 authenticates a client computing device 209 (FIG. 2) as being associated with a person or account. For example, the client computing device 209 may provide a security credential such as a username, password, secure certificate, key, numerical identifier, answers to knowledge-based questions, and/or other types of security credentials. The authorization service 221 then verifies that the security credentials provided by the client computing device 209 are valid. The authorization service 221 may also use other signals (e.g., geographic location, network address, referring uniform resource locator (URL), etc.) in making an authentication determination.

In box 506, the authorization service 221 receives an authorization request from the client computing device 209. For example, a user at the client computing device 209 may seek to access a resource or perform an operation via a relying party service 245 that requires proper authorization.

In box 509, the authorization service 221 determines the permissions that are required to perform the operation or access the resource as requested. The authorization service 221 also determines what level of permissions are currently associated with the client computing device 209.

In box 512, the authorization service 221 may determine that the client computing device 209 requires consent from one or more other users or entities in order to have permission to perform the operation or access the resource. As an example, a child may need permission from a parent to purchase a movie from a video streaming service. As another example, an employee at a company may need permission from a manager (or two managers) in order to access a certain database. The consent may be nested, or that in order to provide consent a user or entity may need consent from another user or entity, which can be repeated in turn any number of times.

In box 515, the authorization service 221 obtains a first authorization token 257 (FIG. 2) representing the required consent of the user or entity. In one scenario, the first authentication token 257 may be loaded from the stored authentication tokens 240 (FIG. 2), where the consent was provided prior to the current authorization request and remains valid. In this regard, the authorization service 221 may verify that the consent remains valid. This may involve contacting one or more other authorization services 221 for nested authorizations in the authentication token 257. For example, a user or entity that granted a previous consent may no longer be able to grant the consent, or may have revoked the consent prior to the expiration. The authorization service 221 may automatically refer to the appropriate data or other authorization services 221 to confirm the status of the respective users and/or entities.

When a new consent (or consents) is required, the authorization service 221 may request consent directly from the user and/or entity. This may involve putting the current authorization flow on hold and sending a notification to the user and/or entity. The user and/or entity may then respond, and the authorization flow may be resumed. Alternatively, or additionally, the authorization service 221 may contact another authorization service 221 to handle obtaining consents from one or more users and/or entities.

In various embodiments, the notification may take the form of a text message, push notification, email message, telephone call, and/or another form of communication. The notification may indicate the requested resource and/or operation and may include information about the requesting user, such as name, username, client device information, information about the relying party service 245, and so forth. The user or entity may choose to approve the consent, reject the consent, and/or forward the request to another user and/or entity to delegate the consent. A first authorization token 257 may be received from another authorization service 221 with information indicating or confirming the consent. The other user and/or entity may be required to authenticate with the other authorization service 221 before providing or rejecting consent.

In box 518, the authorization service 221 may generate a second authorization token 257 based at least in part on the first authorization token 257. For example, the second authorization token 257 may be generated to include an identifier of the account or person who provided the required consent, the scope of the required consent, an identifier of the relying party service 245, and/or other data.

In box 521, the authorization service 221 returns the second authorization token 257. For example, the authorization service 221 may return the second authorization token 257 to the client computing device 209. The client computing device 209 can then forward the second authorization token 257 to the relying party service 245. Alternatively, the authorization service 221 may return the second authorization token 257 directly to the relying party service 245. Thereafter, the operation of the portion of the authorization service 221 ends.

Figure 5B:
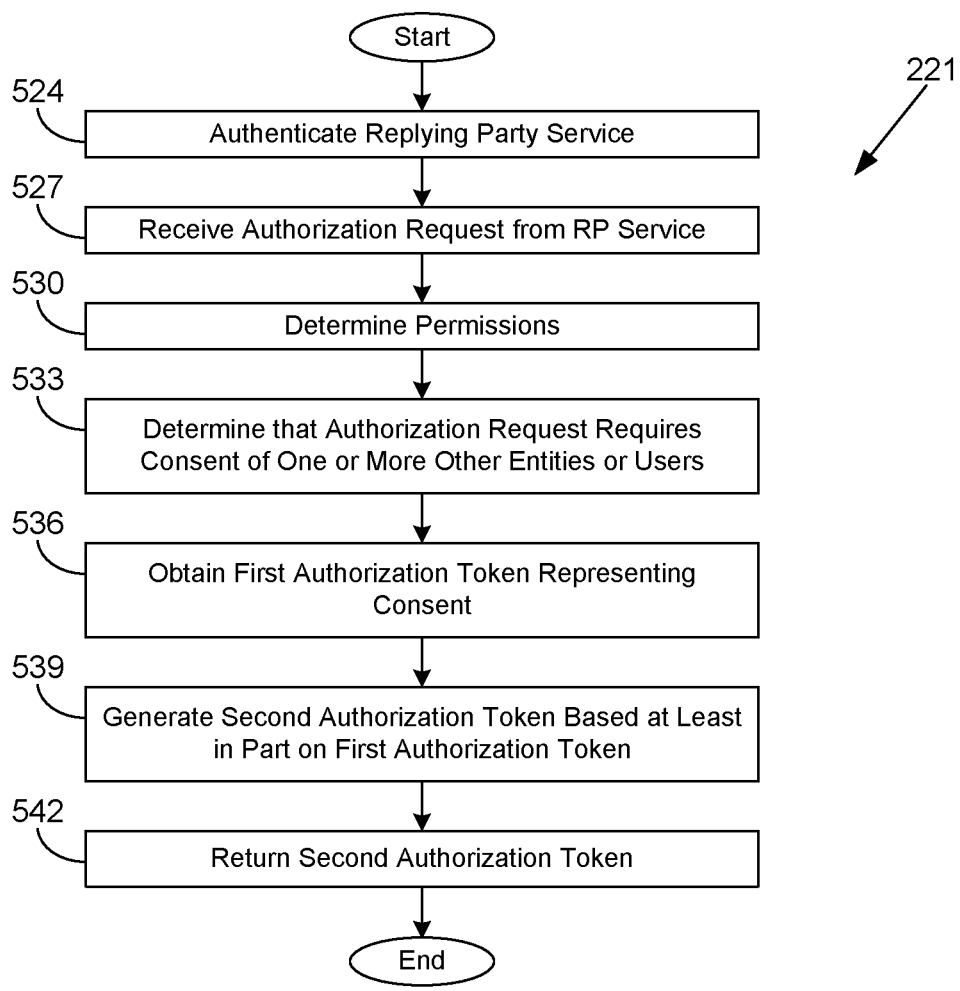

Turning to FIG. 5B, shown is a flowchart that provides one example of the operation of another portion of the authorization service 221 according to various embodiments. It is understood that the flowchart of FIG. 5B provides merely an example of the many different types of functional arrangements that may be employed to implement the operation of the other portion of the authorization service 221 as described herein. As an alternative, the flowchart of FIG. 5B may be viewed as depicting an example of elements of a method implemented in the computing environment 203 (FIG. 2) according to one or more embodiments.

Beginning with box 524, the authorization service 221 authenticates a relying party service 245 (FIG. 2) as being associated with a relying party account. For example, the relying party service 245 may provide a security credential such as a username, password, secure certificate, key, numerical identifier, answers to knowledge-based questions, and/or other types of security credentials. The authorization service 221 then verifies that the security credentials provided by the relying party service 245 are valid. The authorization service 221 may also use other signals (e.g., geographic location, network address, referring uniform resource locator (URL), etc.) in making an authentication determination.

In box 527, the authorization service 221 receives an authorization request from the relying party service 245. For example, the relying party service 245 may seek certain personal information (e.g., name, postal code, email address, etc.) about the user or account that has requested to perform an operation or access a resource.

In box 530, the authorization service 221 determines the permissions that are required to access the information as requested. The authorization service 221 also determines what level of permissions are currently associated with the relying party service 245.

In box 533, the authorization service 221 may determine that the relying party service 245 requires consent from one or more other users or entities in order to have permission to perform the operation or access the resource. As an example, a third party developer may need permission from the owner of an application in order to obtain personal customer information. The consent may be nested, or that in order to provide consent a user or entity may need consent from another user or entity, which can be repeated in turn any number of times.

In box 536, the authorization service 221 obtains a first authorization token 257 (FIG. 2) representing the required consent of the user or entity. In one scenario, the first authentication token 257 may be loaded from the stored authentication tokens 240 (FIG. 2), where the consent was provided prior to the current authorization request and remains valid. In this regard, the authorization service 221 may verify that the consent remains valid. This may involve contacting one or more other authorization services 221 for nested authorizations in the authentication token 257. For example, a user or entity that granted a previous consent may no longer be able to grant the consent, or may have revoked the consent prior to the expiration. The authorization service 221 may automatically refer to the appropriate data or other authorization services 221 to confirm the status of the respective users and/or entities.

When a new consent (or consents) are required, the authorization service 221 may request consent directly from the user and/or entity. This may involve putting the current authorization flow on hold and sending a notification to the user and/or entity. The user and/or entity may then respond, and the authorization flow may be resumed. Alternatively, or additionally, the authorization service 221 may contact another authorization service 221 to handle obtaining consents from one or more users and/or entities.

In various embodiments, the notification may take the form of a text message, push notification, email message, telephone call, and/or another form of communication. The notification may indicate the requested resource and/or operation and may include information about the requesting user, such as name, username, client computing device 209 information, information about the relying party service 245, and so forth. The user or entity may choose to approve the consent, reject the consent, and/or forward the request to another user and/or entity to delegate the consent. A first authorization token 257 may be received from another authorization service 221 with information indicating or confirming the consent. The other user and/or entity may be required to authenticate with the other authorization service 221 before providing or rejecting consent.

In box 539, the authorization service 221 may generate a second authorization token 257 based at least in part on the first authorization token 257. For example, the second authorization token 257 may be generated to include an identifier of the account or person who provided the required consent, the scope of the required consent, an identifier of the relying party service 245, and/or other data.

In box 542, the authorization service 221 returns the second authorization token 257. For example, the authorization service 221 may return the second authorization token directly to the relying party service 245. Thereafter, the operation of the portion of the authorization service 221 ends.

Figure 6:
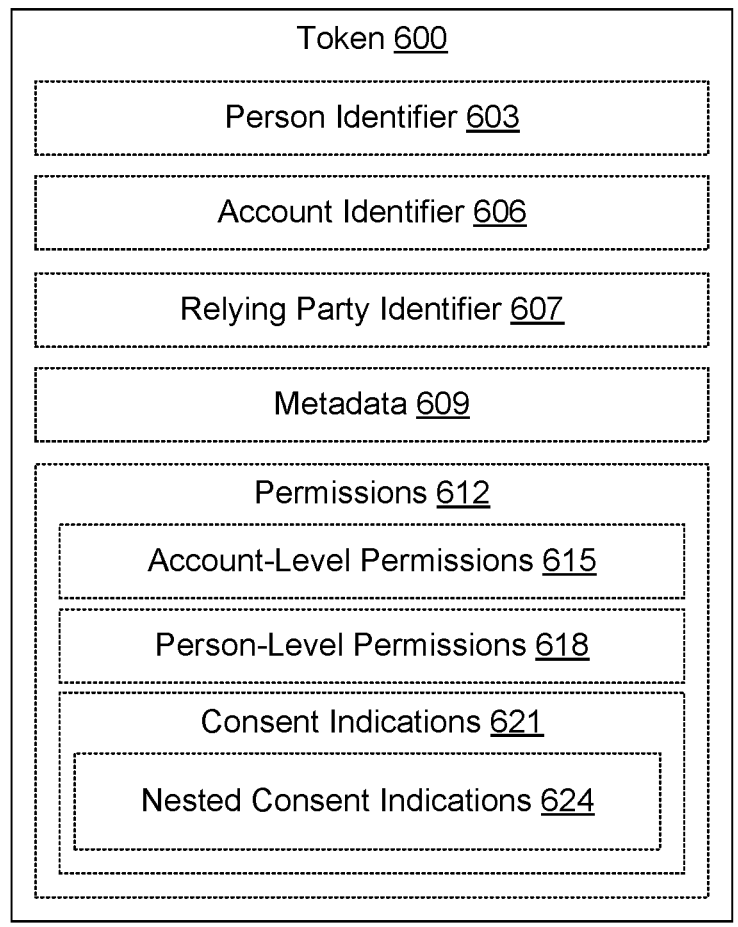
FIG. 6 is a diagram of a token employed in the networked environment of FIG. 2 according to various embodiments of the present disclosure.

Referring next to FIG. 6, shown is a block diagram illustrating one example of a token 600 according to various embodiments. The token 600 may be issued by the authorization service 221 (FIG. 2) to a relying party service 245 (FIG. 2) and subsequently used by the relying party service 245 to obtain information about a user or account from the authorization service 221. Alternatively, the token 600 may be issued by the authorization service 221 to the client computing device 209 and used by the client computing device 209 (FIG. 2) to access a resource or perform an operation using the relying party service 245.

In this example, the token 600 includes a person identifier 603 that uniquely identifies a person, an account identifier 606 that uniquely identifies an account, a relying party identifier 607 that uniquely identifies the application or third-party operating the relying party service 245, metadata 609, permissions 612 for accessing account data 224 (FIG. 2) or person profile data 230 (FIG. 2), a username, encrypted context, and/or other data. In one embodiment, the token 600 corresponds to a Base32-encoded blob in JavaScript Object Notation (JSON), Ion, or another data format. The permissions 612 and/or other data may be encoded and/or encrypted into another token within the token 600, where the encrypted contents may not be decoded or tampered with by the relying party service 245. The permissions 612 may include account-level permissions 615 that control access to resources at the account-level and/or person-level permissions 618 that control access to resources at the person-level.

The permissions 612 may also include consent indications 621 that function to indicate required consents provided by one or more other users or entities. The consent indications 621 in some embodiments may include nested tokens 600 or information from other tokens 600, as well as nested consent indications 624. For example, the consent indications 621 may indicate an identifier of the person or account that provided the consent, a relying party identifier 607, the scope of the consent, the duration of the consent, an identification of an authorization service 221 that can assert the transaction, and other data. This information and the consents may be arbitrarily nested. The tokens 600 may also be in the JSON Web Token format or another format with cryptographic signatures so that the caller can verify that the information has not been tampered with.

In some embodiments, the person identifier 603 may be the same as an account identifier 606 of an account controlled by that person, even though the person may share another account owned by another person (e.g., for the purpose of accessing a living-room-type device). In other words, the person identifier 603 and the account identifier 606 may be unique identifiers within the same shared space of identifiers. In other cases, the person identifier 603 and the account identifier 606 may be unique within a respective person identifier space and a respective account identifier space.

Figure 7:
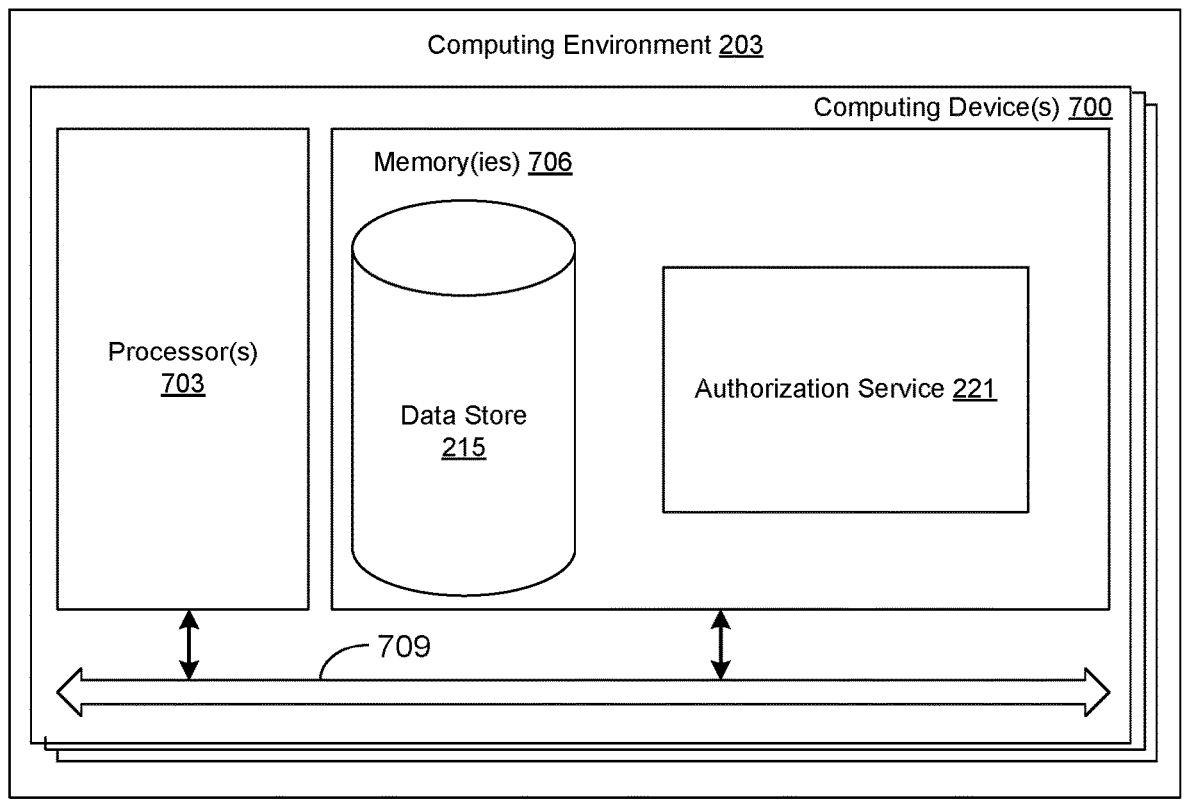
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the authorization service 221 and potentially other applications. Also stored in the memory 706 may be a data store 215 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the authorization service 221, the client application 254 (FIG. 2), and the relying party service 245 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5A and 5B and the sequence diagrams of FIGS. 3 and 4 show the functionality and operation of an implementation of portions of the authorization service 221, the client application 254, and the relying party service 245. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although flowcharts of FIGS. 5A and 5B and the sequence diagrams of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 5A, 5B, 3 and 4 may be executed concurrently or with partial concurrence. Further, in some embodiments, one or more of the blocks shown in FIGS. 5A, 5B, 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authorization service 221, the client application 254, and the relying party service 245, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the authorization service 221, the client application 254, and the relying party service 245, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in at least one computing device, wherein when executed the at least one program causes the at least one computing device to at least:
   authenticate a client device as being associated with a first user based at least in part on a security credential provided by the client device;
   receive an authorization request from the client device for access to a resource provided by a relying party service;
   determine that the authorization request requires a consent of a second user;
   send a notification to the second user requesting the consent;
   obtain a first authorization token representing the consent of the second user from an authorization service;
   generate a second authorization token based at least in part on the first authorization token, the second authorization token including at least one of an identifier of the second user, a scope of the consent, and an identifier of the relying party service, the second authorization token representing an indication of the consent provided by the second user; and
   send the second authorization token to the relying party service.

2. The non-transitory computer-readable medium of claim 1, wherein the resource is associated with an entity, and the first user and the second user are agents of the entity.

3. The non-transitory computer-readable medium of claim 1, wherein, the executed, the at least program causes the at least one computing device to at least:
   receive the second authorization token from the relying party service;
   validate the second authorization token based at least in part on communication with a plurality of different authorization services; and
   send the information associated with the first user to the relying party service.

4. The non-transitory computer-readable medium of claim 1, wherein generating the second authorization token comprises embedding, data from the first authorization token in the second authorization token.

5. A system, comprising:
   at least one computing device; and
   at least one service executable in the at least one computing device, wherein when executed the at least one service causes the at least one computing device to at least:
   authenticate a client device as being associated with a first entity based at least in part on a security credential received from the client device;
   receive an authorization request from the client device, the authorization request being for access by a relying party service operated by the first entity to obtain information associated with a user account;
   determine that the authorization request requires a consent of a second entity;
   obtain a first authorization token representing the consent of the second entity;
   generate a second authorization token based at least in part on the first authorization token, the second authorization token including at least one of an identifier of the second entity, a scope of the consent, and an identifier of the relying party service; and
   send the second authorization token to the relying party service.

6. The system of claim 5, wherein when executed the at least one service further causes the at least one computing device to at least:
   receive the second authorization token from the relying party service;
   validate the second authorization token based at least in part on communication with a plurality of different authorization services; and
   send the information associated with the user account to the relying party service.

7. The system of claim 6, wherein validating the second authorization token further comprises verifying that the second authorization token includes an indication of the consent by the second entity.

8. The system of claim 5, wherein the first authorization token is obtained from an authorization service.

9. The system of claim 8, wherein the authorization service is configured to request the consent from one or more users associated with the second entity.

10. The system of claim 5, wherein the first authorization token is loaded from a data store.

11. The system of claim 5, wherein the second authorization token includes data from the first authorization token.

12. The system of claim 5, wherein the first authorization token represents the consent of at least two authorized users associated with the second entity.

13. A method, comprising:
   authenticating, via at least one or more computing devices, a client device as being associated with a first user based at least in part on a security credential received from the client device;
   receiving, via at least one of the one or more computing devices, an authorization request for access to a resource or to perform an operation provided by a relying party service, the authorization request being received from the client device associated with the first user;
   determining, via at least one of the one or more computing devices, that the authorization request requires a consent of a second user;
   obtaining, via at least one of the one or more computing devices, a first authorization token representing the consent of the second user;
   generating, via at least one of the one or more computing devices, a second authorization token based at least in part on the first authorization token, the second authorization token including at least one of an identifier of the second user, a scope of the consent, and an identifier of the relying party service; and
   sending, via at least one of the one or more computing devices, the second authorization token to the relying party service.

14. The method of claim 13, wherein the first authorization token represents the consent provided by the second user before the authorization request is received from the client device, and the method further comprises determining, via at least one of the one or more computing devices, that the first authorization token has not expired.

15. The method of claim 14, wherein obtaining the first authorization token further comprises loading, via at least one of the one or more computing devices, the first authorization token from a data store.

16. The method of claim 13, wherein obtaining the first authorization token further comprises requesting, via at least one of the one or more computing devices, the first authorization token from an authorization service.

17. The method of claim 13, wherein generating the second authorization token further comprises embedding, via at least one of the one or more computing devices, data from the first authorization token in the second authorization token.

18. The method of claim 13, wherein determining that the authorization request requires the consent of the second user further comprises:

determining, via at least one of the one or more computing devices, that a consent of a third user to the authorization request is no longer effective; and identifying, via at least one of the one or more computing devices, the second user in response to determining that the third user is no longer capable of providing the consent to the authorization request.

19. The method of claim 13, further comprising:

determining, via at least one of the one or more computing devices, that the authorization request requires a consent of the second user and a third user;

obtaining, via at least one of the one or more computing devices, a third authorization token representing the consent of the third user; and wherein generating the second authorization token further comprises generating the second authorization token based at least in part on the third authorization token.

20. The method of claim 19, wherein determining that the authorization request requires the consent of the third user further comprises:

determining, via at least one of the one or more computing devices, that the relying party service is operated by a first entity on behalf of a second entity; and identifying, via at least one of the one or more computing devices, the third user as representing the second entity.

\* \* \* \* \*